United States Patent [19]

Schulz et al.

[11] Patent Number: 4,823,211

[45] Date of Patent: Apr. 18, 1989

[54] ROTARY MAGNETIC TAPE TRANSDUCER HEADWHEEL STRUCTURE

[75] Inventors: Axel Schulz, Bickenbach; Manfred Hescher, Weiterstadt; Berthold Eiberger, Darmstadt, all of Fed. Rep. of Germany

[73] Assignee: Broadcast Television Systems GmbH, Darmstadt, Fed. Rep. of Germany

[21] Appl. No.: 96,857

[22] Filed: Sep. 14, 1987

[30] Foreign Application Priority Data

Dec. 24, 1986 [DE] Fed. Rep. of Germany ....... 3644502

[51] Int. Cl.$^4$ ...................... G11B 15/14; G11B 5/102; G11B 5/52
[52] U.S. Cl. ......................................... 360/64; 360/67; 360/108
[58] Field of Search ..................... 360/67, 68, 64, 108, 360/107

[56] References Cited

U.S. PATENT DOCUMENTS 3,823,415 7/1974 Fisher et al. .................. 360/107
4,524,396 6/1985 Schulz et al. .................. 360/67

FOREIGN PATENT DOCUMENTS 2411402 3/1974 Fed. Rep. of Germany .
3232610 7/1982 Fed. Rep. of Germany .

Primary Examiner—Vincent P. Canney
Attorney, Agent, or Firm—Frishauf, Holtz, Goodman & Woodward

[57] ABSTRACT

To effectively eliminate cross-talk between the weak signals picked up by a tape transducer pick-up head with signals being applied to a recording head, a disk-like headwheel carrier has a disk-like headwheel secured thereto. The disk-like headwheel carrier is formed with a recess which defines a chamber (6) in which the preamplifier for the reproduced signals is placed. Transducer leads are passsed in a channel duct formed between the headwheel carrier and the disk-like headwheel, which is in plate form. Preferably, both the disk-like headwheel as well as the carrier are made of lightweight metal, such as aluminum, so that the reproducing amplifier is totally shielded. The recording amplifier can be placed on top of the disk-like headwheel, separated and shielded from the reproducing preamplifier.

12 Claims, 1 Drawing Sheet

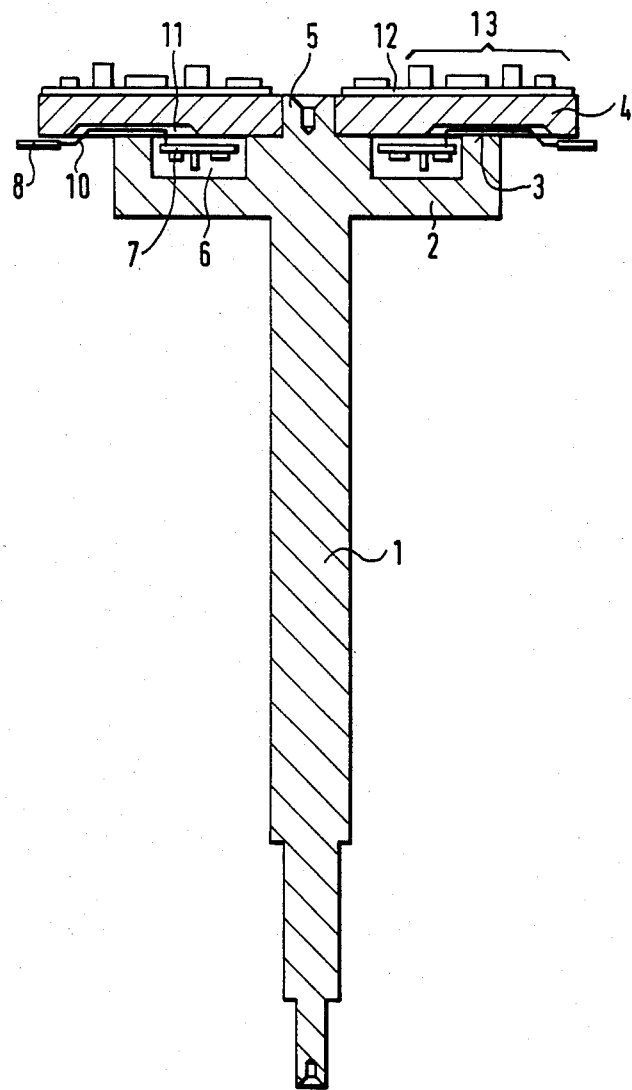

ROTARY MAGNETIC TAPE TRANSDUCER HEADWHEEL STRUCTURE

REFERENCE TO RELATED PUBLICATIONS

German Patent Disclosure Document No. DE-OS 24 11 402
German Patent Disclosure Document No. DE-OS 32 32 610 to which U.S. Pat. No. 4,524,396 corresponds.

The present invention relates to a rotary headwheel structure to carry magnetic transducer heads, particularly for recording and reproduction of television signal on and from, respectively, a magnetic recording medium, typically a magnetic recording tape.

BACKGROUND

Headwheel structures, for example as described in U.S. Pat. No. 4,524,396, to which corresponds German Patent Disclosure Document No. DE-OS 24 11 402, utilize a rotary headwheel having a ring-shaped headwheel rotor element. This headwheel rotor element, which also may be referred to as a headwheel carrier, is disk-like, and has an upper face on which a disk-like headwheel is secured with its lower face against the upper face of the headwheel carrier. A plurality of recording/reproducing transducer heads are secured to the headwheel. Preferably, reproduction and recording amplifiers are also secured to the headwheel, rotating therewith, and electrically coupled to the respective heads.

The referenced German Patent Disclosure Document No. DE-OS 24 11 402 describes such a headwheel rotor with a ring-shaped recess. The rotor is located in the ring-shaped recess of a fixed core portion and hydrostatically journalled therein. The electronic circuits for recording and reproduction of the signals to be recorded, or scanned, respectively, are located in a ring-shaped recess of the rotor. Contact-less transmission of signal voltages and power supply energy is provided.

It has been found that the ring-shaped formation of the rotor with the revolving magnetic heads causes problems regarding bearings, balance, and inertia which are difficult to solve and which have led to a different construction, in which the magnetic head rotors are essentially surface elements, that is, are planar. The rotating magnetic headwheel arrangement has, it has been found in practice, an additional disadvantage: the circuits for amplifying the signal to be recorded are immediately adjacent the circuits for pre-amplification of reproduced signals. Due to the highly different power level and voltage levels in the two circuits, crosstalk between recording signals and reproduced signals is unavoidable, and causes problems.

German Patent Disclosure Document No. DE-OS 32 32 610 describes a headwheel disk having a plurality of magnetic heads located at the circumference thereof. A suitable number of segments, located on the planar surfaces of the heads, retain reproduction pre-amplifier circuit arrangements. This headwheel has the disadvantage, however, in that shielding of the reproduction preamplifier circuits from each other and with respect to the supply leads and circuits of the recording amplifiers is insufficient, and, again, causes difficulties in use.

THE INVENTION

It is an object to provide a headwheel in which magnetic heads are located on the circumference of a rotating headwheel disk, which also retains the reproduction preamplifiers. The spacing between the respective magnetic heads and the associated reproduction preamplifier inputs should be small, and, additionally, the reproduction pre-amplifiers should be completely shielded with respect to other circuit components, for example recording final amplifiers.

Briefly, the upper face of at least the headwheel carrier or the headwheel itself are formed with a recess defining a chamber, and at least part of an amplifier carrier plate, such as a printed circuit with components thereon, is located in the chamber. Typically, the headwheel and headwheel carrier are made of metal. It is then possible to locate the recording output amplifier at the other side of the headwheel, so that the chamber in which the sensitive reproduction preamplifier is located is completely shielded from the recording output amplifier.

The system has the advantage that the rotary headwheel arrangement completely separates the reproduction or pickup pre-amplifier circuit components from the recording amplifier components and provides complete shielding therebetween. Additionally, the arrangement permits use of very short electrical connections between the reproduction or pickup pre-amplifiers and the associated magnetic heads, which further reduces error possibilities, generation of noise, or interferences.

In accordance with a preferred feature of the invention, the headwheel carrier is formed with a planar upper-face which is preferably accurately machined to provide a precise engagement surface for the lower face of the disk-like headwheel. The disk-like headwheel preferably is secured about a central stub on the headwheel carrier, permitting ready access to the chamber in which the pre-amplifier is placed and, further, simple disassembly and reassembly of the disk-like headwheel on the headwheel carrier, for example after replacement, maintenance or the like. Access to the recording amplifier can be obtained at any time, even without disassembly of the disk-like headwheel.

The structure provides a completely enclosed chamber to place all the electrical components of the reproduction pre-amplifier therein. This is a substantial safety factor. The chamber, being closed all around and, hence, also closed circumferentially, provides by the circumferential wall a retention arrangement which can retain electric components which might become separated from the support, typically a printed circuitboard plate, for example due to the effects of vibration, centrifugal force or the like. This prevents damage to the magnetic heads which are expensive; the printed circuitboard can be replaced readily and components within the apparatus of which the headwheel is a part, as well as a magnetic tape, will not be damaged by stray pieces of a damaged preamplifier flying about. Of course, the expensive transducer heads are entirely protected.

DRAWING

The single FIGURE is a longitudinal, that is, axial, cross-sectional view of a magnetic headwheel structure in accordance with the present invention, in which elements not necessary for an understanding of the present invention have been omitted, since they can be of any standard and suitable construction.

DETAILED DESCRIPTION

The upper end of the headwheel shaft 1 is formed with an engagement disk structure 2, forming the headwheel carrier as such. The headwheel carrier 2 has a ring surface 3 on which a headwheel disk 4 is positioned. Headwheel disk 4 is centered by a central stub 5, secured to the shaft 1 in the middle of the headwheel carrier 2. The headwheel disk 4 is secured to the carrier 2 by suitable attachment elements, not specifically shown, and including, for example, a central holding screw. The attachment arrangement can be in accordance with any well-known and suitable construction.

In accordance with a feature of the invention, a ring-shaped recess 6 is formed in the headwheel carrier 2, defining a chamber. The reproducing preamplifier printed circuit-board 7 is retained in the chamber 6. Each one of the reproducing preamplifiers on the preamplifier circuit-board 7 have connecting lines 10 extending to the associated magnetic head; only one such line 10 is shown in the drawing, connected to a flat or planar head shown schematically at 8. The heads themselves are well-known and can be of any suitable flat construction. The lines 10 between the magnetic heads 8 and the preamplifiers on the holding board 7 are led through suitably dimensioned ducts or channels 11 extending preferably radially at the lower side of the headwheel disk 4. Connecting lines extend from the board 7 to the rotating part of a contact-less transformer transmitter to supply the amplifier circuits with operating energy and to transfer the scanned and amplified signals to a fixed portion of a magnetic recording apparatus. Such non-contacting transformer-type transmission elements are well-known and have been omitted from the drawing for clarity, since they can be of any suitable and standard construction.

The headwheel carrier 2, as well as the disk 4, are made of highly electrically conductive material, usually metal, and therefore the headwheel disk 2 and the headwheel carrier 4, together, form a practically complete metallic shielding for the reproduction preamplifiers circuits on its support board, typically a printed circuit-board 7. The printed circuitboard 7, of course, is made of insulating material. The circumferential wall which defines the chamber 6 at the outside forms a reliable retention wall for any electric components which might become separated from the board 7 due to the conjoint effects of centrifugal force and vibration and which, absent such a retention wall, might damage the headwheel and the magnetic heads, as well as additional components.

The preamplifier circuitboards 7 are located close to the engagement surfaces of the headwheel disk 4 and, hence, close to the attachment surfaces of the transducer heads 8. The connecting lines 10 between the magnetic heads 8 and the reproduction preamplifiers on the board 7 thus can be short. The lines 10 run, for the most part, in the ducts or channel 11 so that they are also shielded, and thus essentially immune to picking up stray disturbance or noise signals.

The chambers 6 can be formed entirely in the carrier element 2, or can be formed in the headwheel disk 4, or partly in both. Rather than forming the headwheel carrier 2 as a single element, unitary with the headwheel shaft 1, it is also possible to secure the headwheel carrier 2 on the shaft 1 in a suitable manner and then to center the headwheel carrier. This arrangement has an advantage in that the materials for the headwheel carrier and for the shaft can be selected with respect to the use to which they will be put, so that different materials can be used for the shaft 1 and for the headwheel carrier 2.

The recording amplifiers 13 are located on a circuitboard, typically a printed circuitboard 12 which is located at the upper-side or upper-face of the headwheel disk 4. Due to the metallic structure of the headwheel disk 4, the recording amplifiers 13 are effectively shielded from the reproducing preamplifiers on the board 7.

As can be seen, assembly, disassembly and maintenance of the reproducing preamplifiers on the printed circuit-board are simple, and the reproducing amplifiers 7 are easily accessible after removal of the disk 4 from the carrier element 2.

Various changes and modifications may be made within the scope of the inventive concept

We claim:

1. Rotary headwheel structure (1), for recording and reproduction of signals on and from, respectively. a magnetic recording medium such as magnetic tape, having
   a disk-like headwheel carrier (2) having an upper-face (3);
   a disk-like headwheel (4) having a lower-face, secured to the upper-face of the headwheel carrier;
   a plurality of recording/reproducing transducer heads (8) secured to the headwheel;
   reproducing preamplifier means coupled to the transducer heads; and
   an amplifier carrier plate (7) secured to the headwheel for rotation therewith and mechanically supporting said reproduction preamplifier means
   and wherein, in accordance with the invention,
   at least one of:
   the upper-face of the headwheel carrier (2); the lower-face of the headwheel disk (4)
   are formed with a recess defining an annular chamber (6) and
   wherein at least part of the amplifier carrier plate (7) and the reproduction preamplifier means thereon is located in said chamber (6).

2. The structure of claim 1, wherein the chamber is formed in the upper-face of the headwheel carrier (2).

3. The structure of claim 1, wherein the chamber (6) is ring-shaped, and formed in the upper-face of the headwheel carrier (2), said headwheel carrier having a projecting centering stub (6) and an external ring-shaped engagement surface, said ring-shaped chamber being located between the centering stub and the external engagement surface, for reception of the reproduction preamplifier means.

4. The structure of claim 3, wherein said ring-shaped chamber (6) is closed by the headwheel disk (4), the lower surface of the headwheel disk fitting against the ring-shaped upper surface of the headwheel carrier and, the headwheel disk being centered by said centering stub.

5. The structure of claim 1, wherein both the headwheel carrier (2) and said headwheel disk (4) are made of electrically conductive material.

6. The structure of claim 1, wherein both said headwheel carrier (2) and said headwheel disk (4) are made of metal.

7. The structure of claim 1, wherein the magnetic heads for reproduction are located on a theoretical planar surface conicident with the upper-face of the headwheel carrier.

8. The structure of claim 1, wherein the magnetic heads (8) for reproduction are located on the lower-face of the headwheel disk (4).

9. The structure of claim 8, wherein the headwheel disk (4) is formed with ducts or grooves (11) to provide space to pass connecting lines from the respective reproduction heads to the reproduction preamplifier means.

10. The structure of claim 8, wherein the upperface (3) of the headwheel carrier (2), in the parts of the region of engagement of the headwheel disk (4) on the headwheel carrier, is formed with grooves or channels (11) to permit passage of connection wires from the reproduction heads to the reproduction preamplifier means.

11. The structure of claim 1, further including a recording amplifier (13) located on an upper-face of the headwheel disk (4).

12. The structure of claim 11, wherein both said headwheel carrier (2) and said headwheel disk (4) are made of metal, the metal of the headwheel disk providing for shielding and electrical inductive separation of signals in the reproduction preamplifier and on the preamplifier carrier plate (7) and the recording amplifier (13).

* * * * *